UNITED STATES PATENT OFFICE.

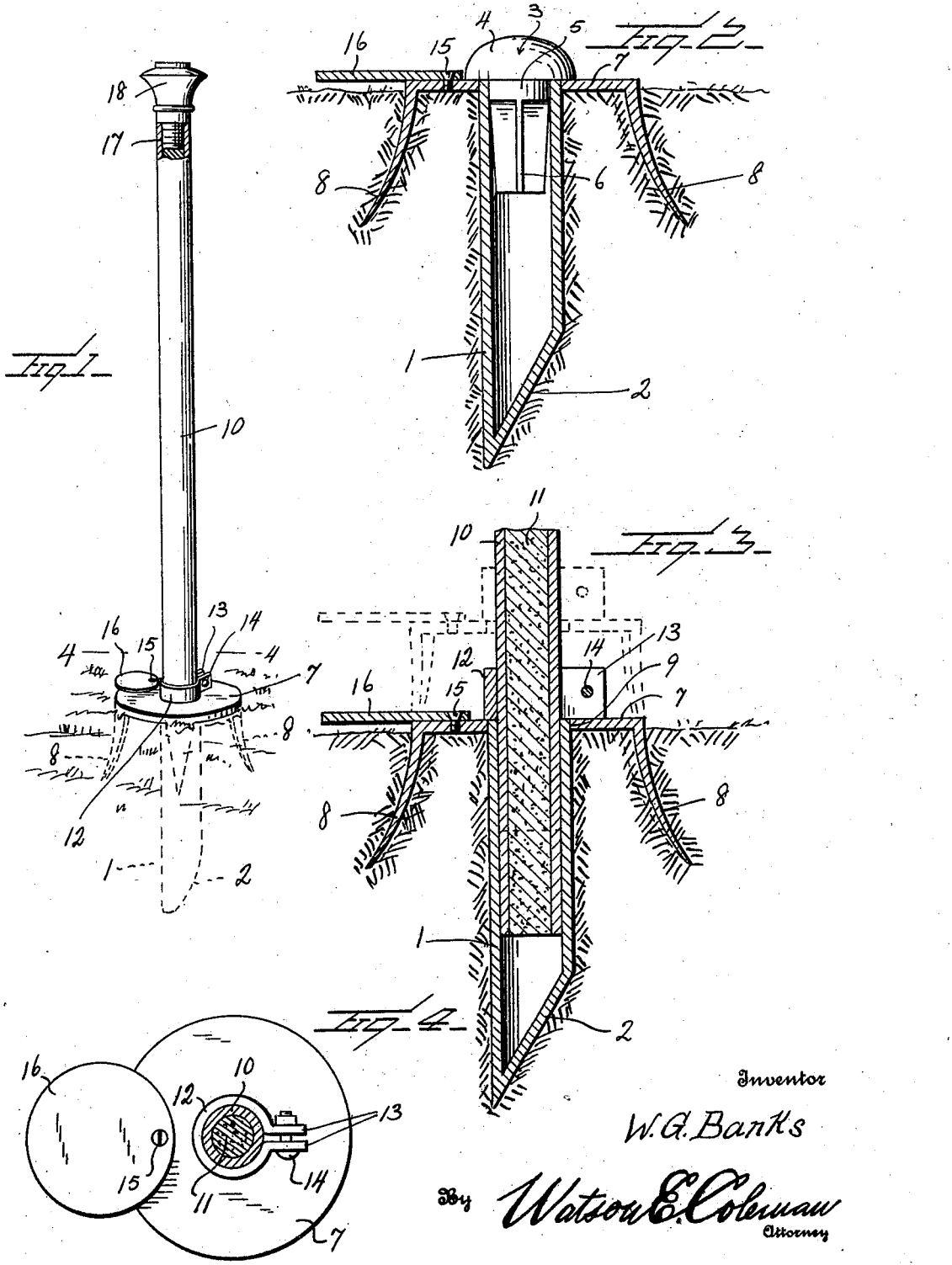

WILLIS G. BANKS, OF NEWARK, NEW JERSEY, ASSIGNOR TO JOHN W. BANKS, OF NEWARK, NEW JERSEY.

LINE-SUPPORTING POST.

1,402,561.  Specification of Letters Patent.  Patented Jan. 3, 1922.

Application filed February 11, 1920. Serial No. 357,781.

*To all whom it may concern:*

Be it known that I, WILLIS G. BANKS, a citizen of the United States, residing at Newark, in the county of Essex and State of New Jersey, have invented certain new and useful Improvements in Line-Supporting Posts, of which the following is a specification, reference being had to the accompanying drawings.

This invention relates to a post for supporting fence wire or clothes lines, and an object of the invention is to provide a device of this kind which can be cheaply constructed and sold at a very reasonable profit.

Another object is the provision of a line supporting post tubular in form and filled or compact with concrete or cement to insure strength and rigidity.

Still another object resides in a post receiving socket adapted to be driven into the ground for the reception of the line supporting post, in combination with a cover plate pivoted upon a brace on the socket to cover the socket in order to keep the dirt and sand out of the socket when the post is not received therein.

A further object embodies a socket brace adapted to be driven into the ground and designed to receive the upper end of the socket, to hold and reinforce the same in position. This socket brace is designed to be constructed from a single piece of metal, constructed by one stamping operation or one operation of a drop forge method, and is formed with a plurality of prongs to enter the ground to hold and reinforce the same in position.

A still further object embodies a clamp carried by the tubular line supporting post, serving the function of preventing excessive bulging of the tubular post when it is being filled with concrete or cement. This clamp also serves as means used as an abutment and driving device to force the socket brace into the ground.

Additionally the invention aims to provide means in the form of a driving cap to be struck by a hammer or sledge for driving the post receiving socket into the ground. This driving cap is provided with means to center the same into the socket, while the cap is in use.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view of the improved line supporting post constructed in accordance with the invention.

Figure 2 is a sectional view through the post receiving socket mounted in the ground and illustrating the driving cap engaged with the socket, whereby it may be driven home, Figure 3 is a sectional view through the post receiving socket, showing the socket brace engaging the upper end of the socket, and driven into the ground to reinforce the socket in position, and also illustrating the brace in a raised position in dotted lines showing its arrangement before it is driven entirely into the ground, Figure 4 is a cross sectional view on line 4—4 of Figure 1 transversely through the clamp of the line supporting a post, showing the socket and brace in plan view.

Referring more especially to these drawings, 1 designates a tubular post receiving socket, which may be any suitable length or diameter or constructed of any suitable metal, preferably steel or iron. The lower end of this metallic tubular socket is bevelled off as indicated at 2 thereby facilitating the driving of the socket into the ground. A driving cap 3 is provided and which comprises a head 4, and a cylindrical reduced part 5, downwardly from which intersecting integral ribs or blades 6 extend. These blades or ribs are tapered as shown, and act as means for centering the driving cap into and with relation to the socket. The socket, when it is desired to drive the same in the ground is placed in position. The driving cap is then inserted and then by successive hammer blows from a hammer or sledge on the head of the driving cap the post receiving socket may be driven home. However, the socket is not driven into the ground so that its upper end will be below the surface of the ground, but just sufficient as to permit a portion of the socket to extend above the surface. This is done in order that the socket brace 7 may be employed to reinforce the socket in position. This brace 7 is designed to be constructed from a single piece of metal, constructed as previously set forth, namely by a single stamping or drop forge method. The top of the socket brace is circular in form and is provided with a plurality of depending holding prongs 8. These prongs 8 are V-shaped and are deflected outwardly and downwardly, and when driven into the ground act to hold the brace firm and secure. It will be noted that the central opening 9 of the circular plate at top of the brace 7 is of sufficient diameter to neatly receive the upper end of the socket, in order to reinforce the socket and hold it firm. The socket 1 is adapted for the reception of the tubular metallic fence wire or clothes line supporting post 10. As this post is tubular in construction it is designed to receive a heavy filling of concrete or the like 11 to insure strength and rigidity. This post may be constructed from drawn steel tubing, which is made in various lengths for the trade. Such lengths of tubing may be bought by the manufacturer, when constructing this present invention, and the desired lengths of posts may be cut from the various lengths of tubing. A clamp 12 is mounted adjustably upon the fence wire or clothes line supporting post, and this clamp is in the form of a cylindrical split band. The split end portions of the band are outwardly turned to form ears 13 which are arranged in parallelism with each other. A holding bolt 14 passes through apertures of the ears and is provided with a nut 15 to draw the band securely about the post 10. This band is designed to prevent excessive bulging of the tubular post when filling the same with concrete or cement. The band or clamp 12 constitutes an abutment, acting to strike the upper plate of the socket brace to drive the brace in position in order that the brace may receive the upper end of the socket. The driving of the brace may be accomplished by imparting successive up and down movements to the post 10, similar to imparting movements to a tamper causing the band or clamp 12 to impart successive hammer blows upon the brace, driving its prongs 8 into the ground. However, the brace may be otherwise driven into the ground, for instance by means of a sledge or hammer if desired. The upper plate of the brace has pivotally mounted thereon by means of a screw 15 a cover plate 16 which is designed to cover the upper end of the post receiving socket, when the post is not in use, thereby preventing dirt, sand and other refuse from falling into and filling the socket. To close the socket the plate 16 may be swung pivotally until it is concentric with the brace. The upper end of the tubular post 10 has its interior threaded as at 17, and engaging therewith is a metallic cap or post top 18 in order to give the post a finished appearance. Any suitable means, not shown, may be employed for attaching fence wires or clothes lines to the post. If desired, the fence wires may be wrapped around the post and then twisted or tied together in any suitable manner. By means of the socket brace, the post is given sufficient strength and rigidity, and also is held in a perpendicular position.

The invention having been set forth, what is claimed as new and useful is:

In a post receiving socket, a tubular member having its upper end open and its closed end beveled and adapted to be driven or sunk in the ground, with a small portion of the open end projecting above the surface and constituting a post receiving socket, a circular brace plate constructed from a single piece of heavy sheet metal provided with a central opening tightly receiving the upper projecting part of the tubular member at the same time or after the tubular member is driven into the ground, said circular brace plate having depending yieldable prongs on its margin, said prongs being integral with the brace plate and tapered, and each extending downwardly and slightly off-set from a perpendicular, whereby upon driving the plate in contact with the ground with its center opening receiving the upper end of the tubular member, the prongs deflect laterally and outwardly to anchor the brace in position, and a cover plate movably attached to the upper surface of the circular brace plate to close the upper end of the socket, to prevent dirt, and the like from entering the tubular member when the post is removed.

In testimony whereof I hereunto affix my signature.

WILLIS G. BANKS.